(12) United States Patent
Meadows et al.

(10) Patent No.: US 10,062,124 B2
(45) Date of Patent: Aug. 28, 2018

(54) SYSTEM AND METHOD FOR CONSTRUCTION ESTIMATING

(71) Applicant: Construction Solver LLC, Newburyport, MA (US)

(72) Inventors: Michael D. Meadows, Newburyport, MA (US); Gregory D. Farnell, Newburyport, MA (US); Christopher P. Farnell, Newburyport, MA (US); Michael J. Leonard, Newburyport, MA (US)

( * ) Notice: Subject to any disclaimer, the term of this patent is extended or adjusted under 35 U.S.C. 154(b) by 895 days.

(21) Appl. No.: 14/478,992

(22) Filed: Sep. 5, 2014

(65) Prior Publication Data

US 2015/0066562 A1    Mar. 5, 2015

Related U.S. Application Data

(60) Provisional application No. 61/874,347, filed on Sep. 5, 2013.

(51) Int. Cl.
    *G06K 9/00*    (2006.01)
    *G06Q 50/08*   (2012.01)
    *G06Q 10/06*   (2012.01)

(52) U.S. Cl.
    CPC ....... *G06Q 50/08* (2013.01); *G06Q 10/06313* (2013.01)

(58) Field of Classification Search
    None
    See application file for complete search history.

(56) References Cited

U.S. PATENT DOCUMENTS

2007/0168153 A1*  7/2007  Minor ............... G01B 11/02
                                                  702/158

* cited by examiner

*Primary Examiner* — Atiba O Fitzpatrick
(74) *Attorney, Agent, or Firm* — Hodgson Russ LLP

(57) ABSTRACT

The present disclosure provides methods and systems for computer-based construction estimation. An electronic image is obtained wherein a placard is shown in the electronic image. A scaling factor is determined using the a priori known geometry of the placard. One or more measurements may be calculated of a structure in the electronic image using the calculated scaling factor. A system is described for implementing the method.

13 Claims, 11 Drawing Sheets
(10 of 11 Drawing Sheet(s) Filed in Color)

SYSTEM AND METHOD FOR CONSTRUCTION ESTIMATING

CROSS-REFERENCE TO RELATED APPLICATIONS

This application claims priority to U.S. Provisional Application No. 61/874,347, filed on Sep. 5, 2013, now pending, the disclosure of which is incorporated herein by reference.

FIELD OF THE DISCLOSURE

The disclosure relates to the field of construction, and more particularly to construction estimation.

BACKGROUND OF THE DISCLOSURE

Providing estimates for construction, and especially renovation, has traditionally been a subjective endeavor. In addition to estimating the labor required for renovation work, the provider must also estimate the materials required for the job. It is frequently not practical for the provider to accurately measure the relevant portions of the structure and build estimates from such measurements. For example, it is typically not practical to measure the dimensions of a roof or of siding—accounting for windows, doors, chimneys, etc.—in order to provide accurate estimates of the cost of materials.

For this reason, estimators rely on experience and, even then, often estimate the area with some extra margin to ensure that there is no shortage of materials for the job at hand. At the same time, a builder cannot add too much margin to their bids or they will risk losing jobs to competitors that are able to provide lower bids. For this reason, there is a long felt need for a more accurate way to estimate the dimensions, and derivative measurements, such as area and volume, of a structure in order to provide better estimates to customers.

BRIEF SUMMARY OF THE DISCLOSURE

In a method of the present disclosure, an electronic image is obtained, wherein the electronic image includes an image of a placard having predetermined dimensions. The method comprises displaying the electronic image on a display; receiving the location of the placard within the electronic image; determining the dimensions of the image of the placard; and calculating a scaling factor based on the dimensions of the image of the placard. At least two reference points in the electronic image and a measurement type are received. A measurement is calculated using the at least two received reference points and the calculated scaling factor. An estimate is generated using the calculated measurement.

The present disclosure may be embodied as a system for generating a construction estimate. The system comprises a processor and a camera in electronic communication with the processor. The system further comprises a display and an input device, each of which are in electronic communication with the processor.

The processor is programmed to perform any of the methods described herein. For example, the processor may be programmed to receive, from the camera, an electronic image of a portion of the structure, wherein the electronic image includes an image of a placard having predetermined dimensions at a location proximate to the portion of the structure; display the electronic image on the display; receive, from the input device, a signal corresponding to the location of the placard within the electronic image; determine the dimensions of the image of the placard; calculate a scaling factor based on the dimensions of the image of the placard and the predetermined dimensions of the placard; receive, from the input device, at least two reference points in the electronic image and a measurement type; calculate a measurement of the received measurement type, using the at least two reference points and the calculated scaling factor; and generate an estimate for renovating the structure using the calculated measurement.

DESCRIPTION OF THE DRAWINGS

The patent or application file contains at least one drawing executed in color. Copies of this patent or patent application publication with color drawing(s) will be provided by the Office upon request and payment of the necessary fee. For a fuller understanding of the nature and objects of the invention, reference should be made to the following detailed description taken in conjunction with the accompanying drawings, in which.

DETAILED DESCRIPTION OF THE DISCLOSURE

Figure 19:
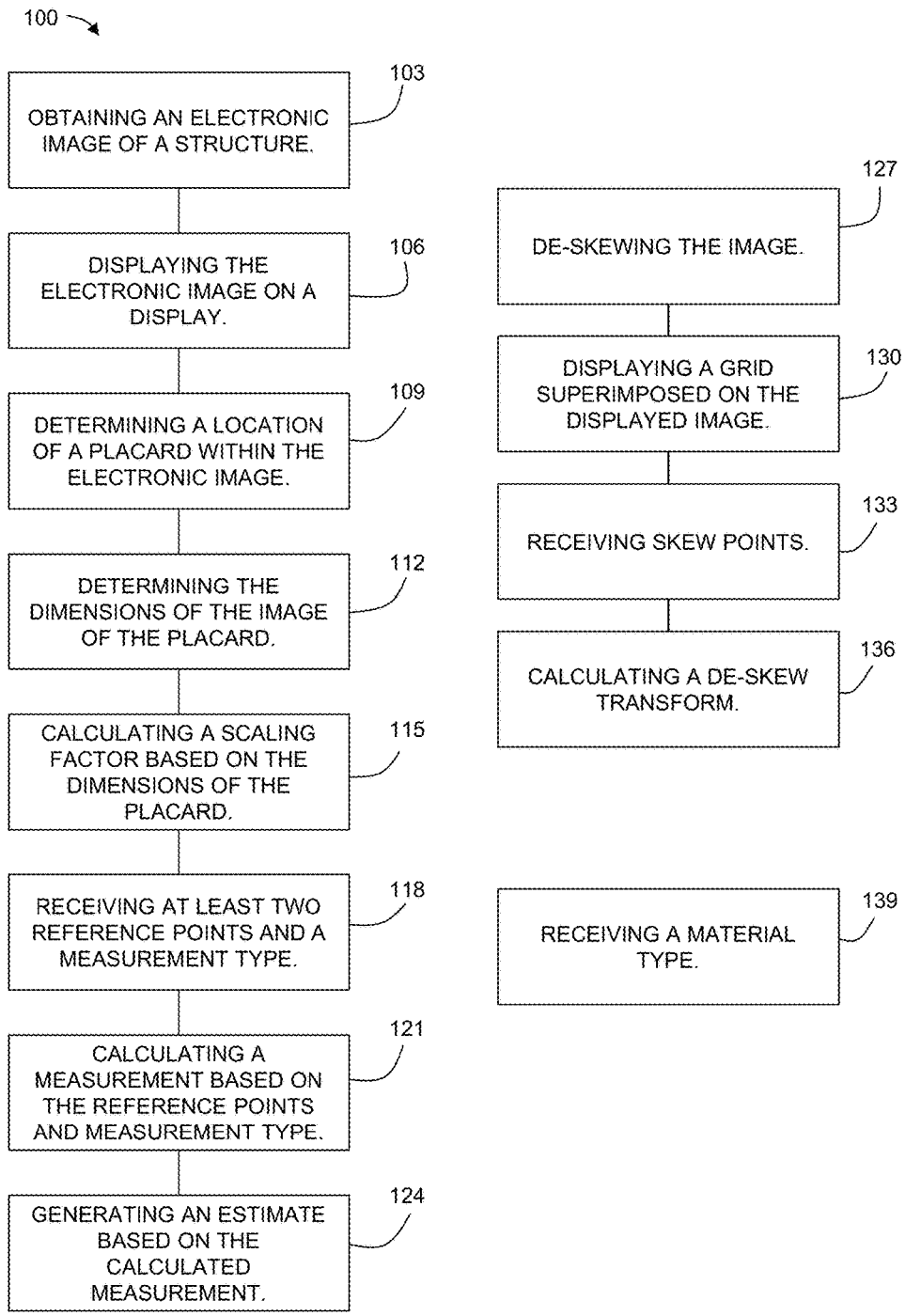
FIG. 19 is a flowchart of a method according to another embodiment of the present disclosure.

The present disclosure may be embodied as a method 100 for generating an estimate for renovating a structure (see, e.g., FIG. 19). It should be noted that in the present disclosure, renovation of a structure includes renovation of only portions of the structure. For example, renovation of a structure includes replacement of the roof of the structure. In another example, renovation of a structure includes painting one or more rooms of the structure. In an embodiment, the method 100 is performed using a device having a processor, a camera, a display, and an input device. An exemplary device suitable for use with the present method 100 is an Apple® iPad®, but other suitable devices will be apparent in light of the present disclosure.

In the method 100, an electronic image of a portion of the structure is obtained 103. In the aforementioned roof replacement example, an electronic image of a portion of the roof, for example, a front elevation image, is obtained 103. Other images may be obtained 103 such that images of the relevant parts of the structure being renovated are processed as described below. The electronic image may be obtained 103 in any manner such as, for example, captured using a camera or from a storage location where a previously captured image has been stored. The term electronic image should be broadly interpreted to include photographs captured using cameras as well as illustrations, blueprints, etc.

The electronic image includes an image of a placard. For example, where the obtained 103 electronic image is the front elevation of a house, a placard may be placed against the front of the house (i.e., at a location proximate to the portion of the structure being imaged) such that the placard is included within the electronic image. The placard has predetermined dimensions. In one embodiment, the placard is 8" by 30". Other geometries may be used within the scope of the present disclosure.

The obtained 103 electronic image is displayed 106 on a display. The location of the placard within the electronic image is determined 109. In an embodiment, the placard is recognized in the image and the location automatically determined. The placard may include a predetermined pattern such that it is more readily recognized by the computer. In another embodiment, the location of the placard is determined 109 by receipt of a placard location indicator from the user. In the example of an Apple iPad, the electronic image is displayed 106 on the display of the tablet, and a user can touch the image of the placard within the displayed 106 electronic image to provide a placard location indicator. More than one placard location indicator may be provided by the user, for example, by providing indicators which outline the perimeter of the placard. The touch sensitive input device of the tablet will signal the processor such that the location of the placard is determined 109.

Once the location of the placard is determined 109, the dimensions of the image of the placard are determined 112. In one embodiment, the dimensions of the image of the placard are determined 112 in terms of image pixels. For example, a typical electronic image captured using an iPad may be 2592=1936 pixels, and the image of the placard within the electronic image may be determined 112 to be 48 pixels by 180 pixels using known image processing techniques (e.g., locating the edges of the placard). The placard may be configured such that the image of the placard is more easily processed. For example, the placard may be of a color which contrasts with colors typically found in structures.

A scaling factor is calculated 115 based on the determined 112 dimensions of the image of the placard and the predetermined dimensions of the placard. In the above example of a placard having predetermined dimensions of 8"×30", and a placard image having dimensions of 48×180 pixels, the scaling factor would be calculated 115 as 6 pixels in image space equals 1" in actual size (for objects at substantially the same distance from the camera as the placard).

The method 100 further comprises receiving 118, from a user, at least two reference points in the electronic image and a measurement type. For example, the user may indicate reference points bounding an area (the four points (denoted with 'X' marks) which bound the side of the first floor in FIG. 2B). The user may also indicate a measurement type of "area" using the touchpad input device, and the user's input is received 118 from the touchpad. A measurement of the received 118 measurement type is calculated 121 using the received 118 reference points and the calculated 115 scaling factor. In the example depicted in FIGS. 2A and 2B, the side of the first floor may be bound by the four reference points indicated by the user, which has image space dimensions of 2016 pixels wide by 504 pixels high. Using the previously calculated 115 scaling factor, the actual size of the indicated area is calculated 121 as 336" wide (2016 pixels÷6 pixels per inch) by 84" high (504÷6) or 196 square feet (28' wide×7' high).

Figure 1:
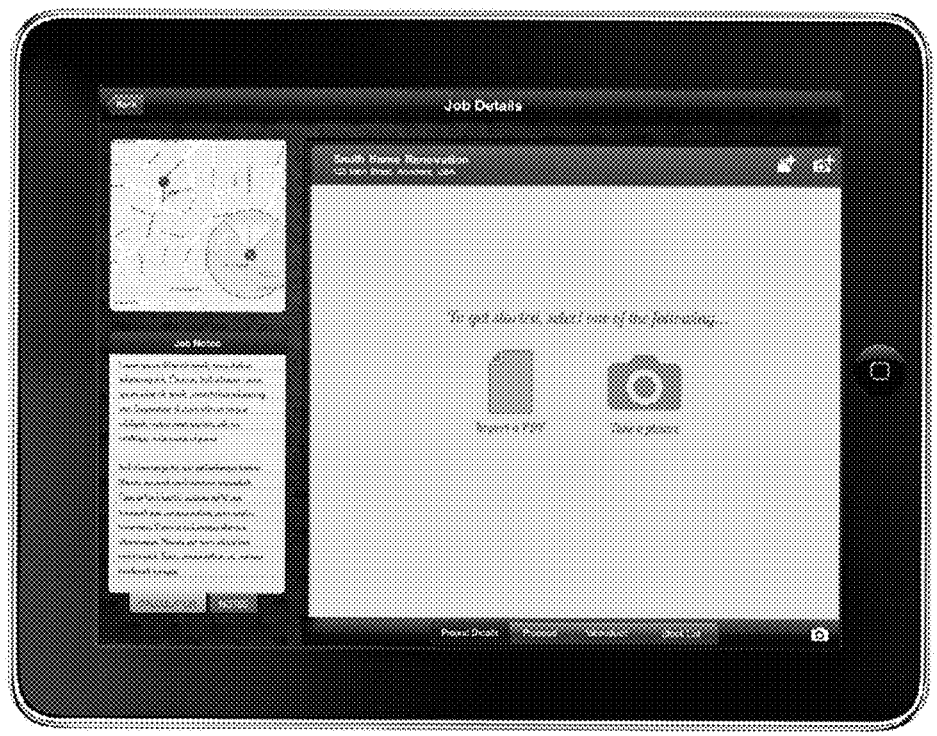
FIG. 1 depicts an exemplary screen of a display according to an embodiment of the present disclosure showing a prompt for obtaining an electronic image by either importing from a PDF or taking a picture.
Figure 2A:
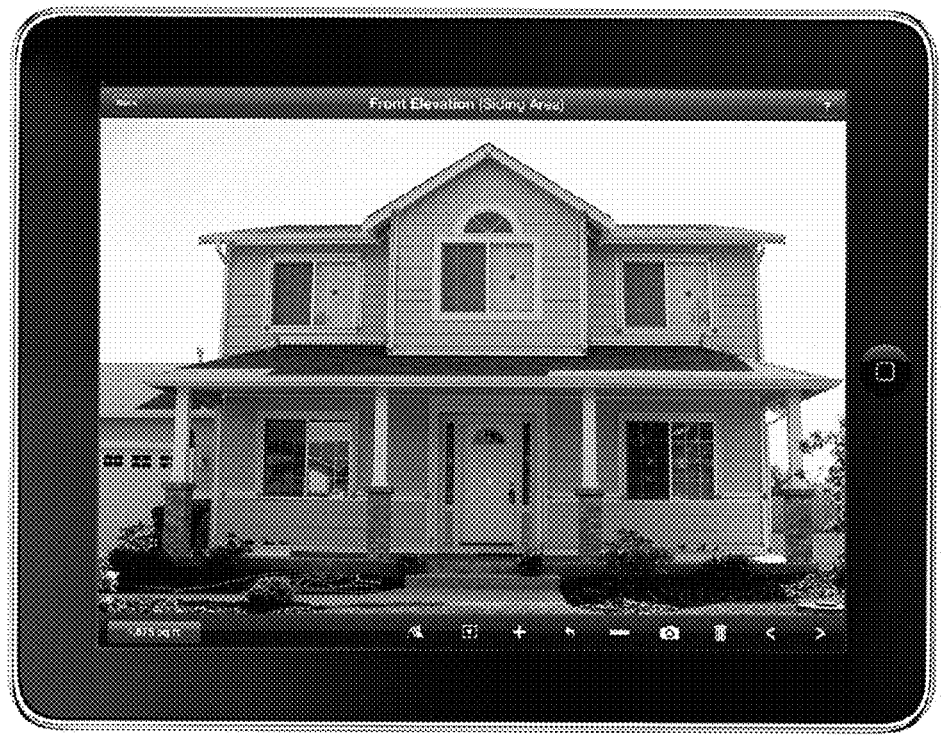
FIG. 2A depicts an exemplary screen of a display according to an embodiment of the present disclosure showing a front elevation of a structure and a plurality of reference points.
Figure 2B:
FIG. 2B depicts the exemplary screen of FIG. 2A wherein portions have been emphasized for clarity.
Figure 3:
FIG. 3 depicts the screen of FIG. 2A wherein the areas bounded by area reference points are enhanced for visualization by the user.
Figure 4:
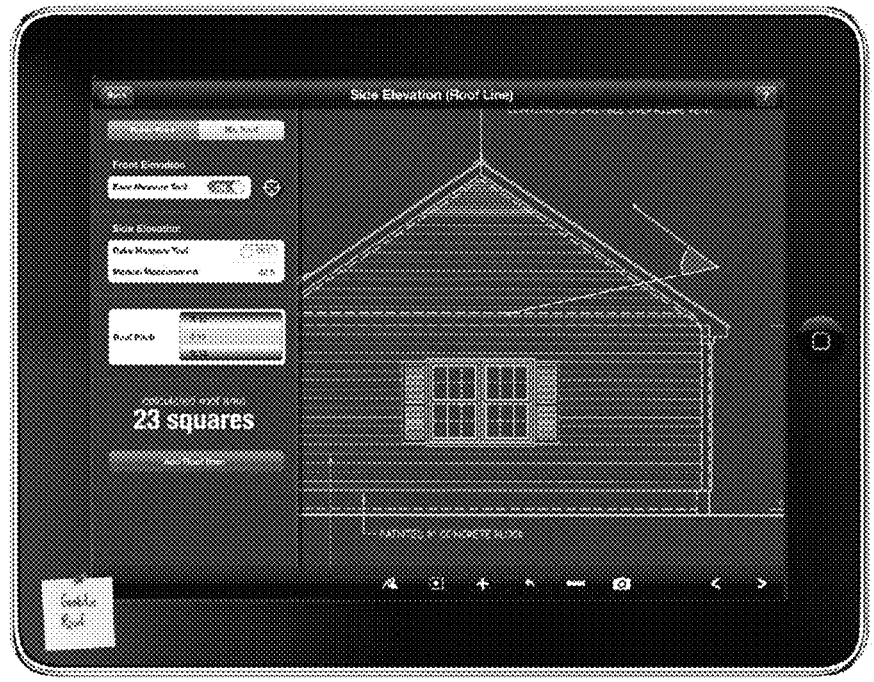
FIG. 4 depicts an exemplary screen of a display according to an embodiment of the present disclosure showing a side elevation image (from a blueprint) and prompts for roof measurement reference points.

In another example, the linear feet of trim may be indicated by the user using a plurality of points (at least two points for distance), such as the points indicated with ● marks in FIG. 2B. And the amount of material required may be determined by calculating 121 the total linear distance between the blue reference points.

In another example, the number of reference points may be calculated 121. For example, in FIG. 2B, each window is indicated by the user with a ■. And the measurement type of "count" is input such that the number of windows is calculated 121. These measurements are only exemplary to illustrate the use of the method; a skilled person will recognize other measurement types that may be used in light of the present disclosure such as, for example, volume and angle.

The calculated 121 measurement is used to generate 124 an estimate for renovating the structure. Revisiting the previous examples, the calculated 121 area of the first floor side, linear footage of trim, and count of windows may be used to generate 124 an estimate for the siding, trim, and window materials required for a renovation project.

As previously mentioned, multiple electronic images may be obtained 103 and processed as described above such that all relevant parts of the structure are analyzed for the estimate. For example, for a siding project, each side of the house having siding should be imaged and measured using the method 100 described herein. Similarly, multiple sets of a same measurement type may be calculated 121 and the summed For example, FIGS. 2A and 2B show an image with four bounded areas for siding (first floor, second floor left, second floor center, and second floor right) method 100 may further comprise receiving an additional set of at least two references points summing the calculated measurements for each set of reference points.

The method 100 may further comprise the step of de-skewing 127 the electronic image such that the measurement(s) may be more accurately calculated 121. De-skewing 127 corrects for planes which are not perpendicular to the focal axis of the camera (e.g., points in the image which are not equidistant from the camera). The calculated 115 scaling factor is not accurate for points which are not the same distance from the camera as the placard. The scaling factor inaccuracy may not be significant for some images/measurements (for example, the measurements of FIG. 2B). However, the inaccuracy may increase where the image is skewed by, for example, an electronic image captured from an off-center location. In another example, the inaccuracy may be significant for certain measurements such as, for example, calculating the area of a sloped surface (e.g., a roof).

The step of de-skewing 127 the image may comprise the sub-steps of displaying 130 a grid superimposed over the displayed 106 electronic image. The user may use the input device (e.g., touch pad, etc.) to alter the superimposed grid to correspond with the shape of the relevant portions of the structure in the image, thereby creating skew points (displaced points of the superimposed grid). In this way, skew points are received 133 and used to calculate 136 a de-skew transform. The de-skew transform may then be utilized to transform locations in image space to de-skewed locations such that the de-skewed locations may be used in calculating 121 measurements for more accurate calculations.

The material type may be received 139 such that the generated 124 estimate may account for the material type. For example, when calculating the area of a roof, the material type of "shingles" may be received 139 and the estimate may describe the area in terms of "roofing squares" (equivalent to 100 sq. ft.) or shingle bundles (equivalent to ⅓ of a roofing square).

Figure 5:
FIG. 5 depicts the screen of FIG. 4 including further prompts for indicating reference points.
Figure 6:
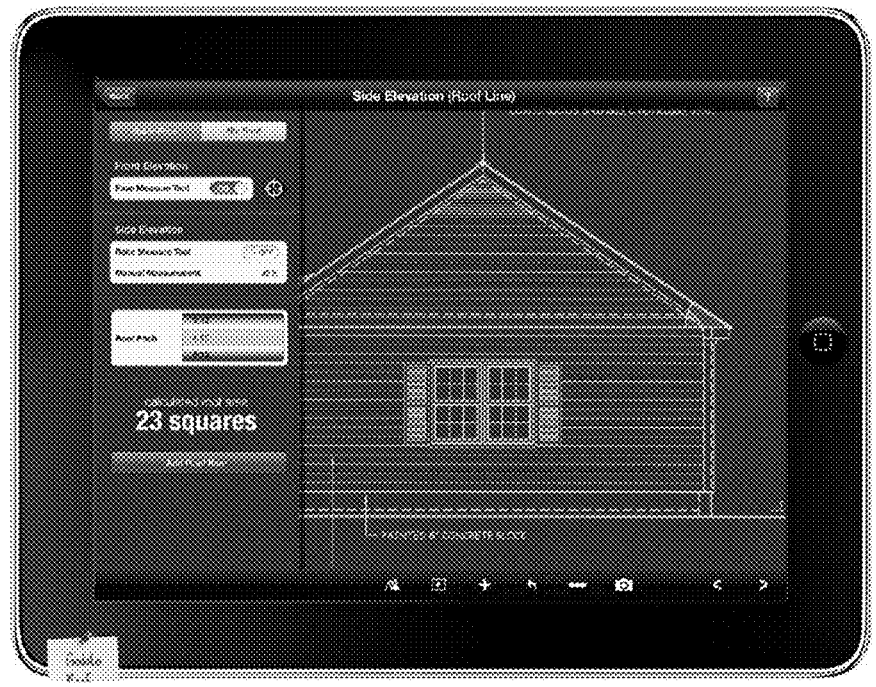
FIG. 6 depicts the screen of FIGS. 4-5 wherein the reference points are indicated for roof pitch measurement.
Figure 7:
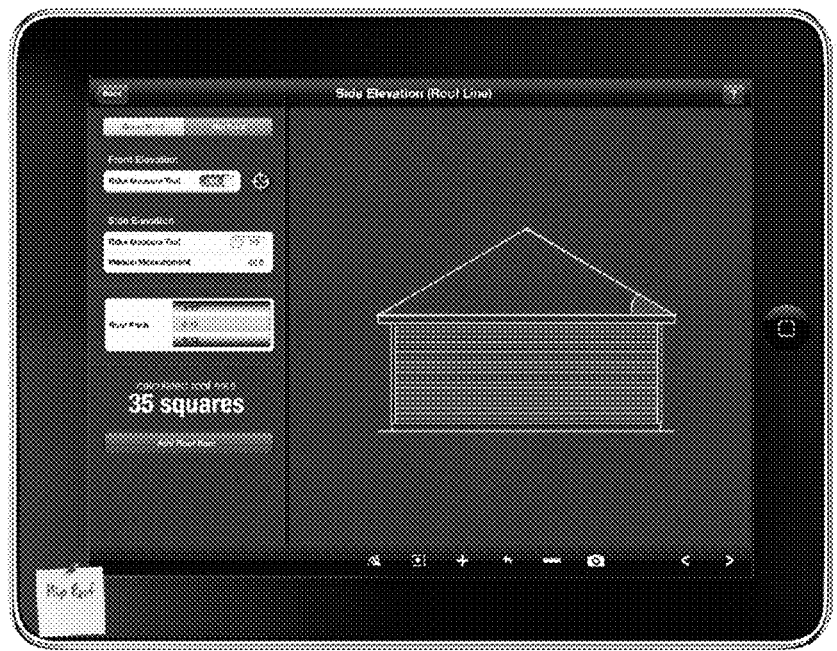
FIG. 7 depicts another view of the screen of FIGS. 4-6 wherein the magnification of the view of the structure has been reduced.
Figure 8:
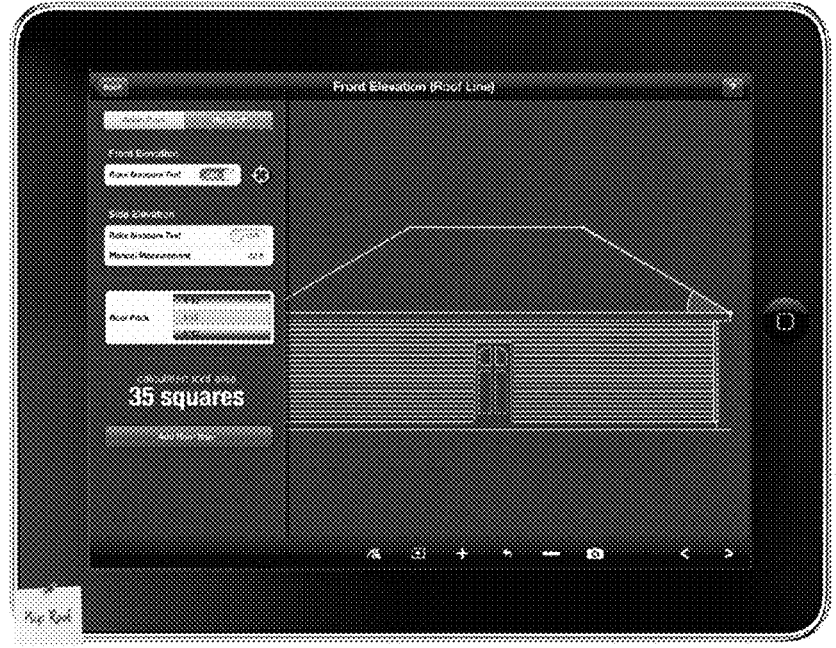
FIG. 8 depicts another view of the screen of FIGS. 4-7 wherein the structure has a hip roof.
Figure 9:
FIG. 9 depicts an exemplary screen of a display according to an embodiment of the present disclosure showing a de-skewing grid superimposed on the displayed image of a front elevation.
Figure 10:
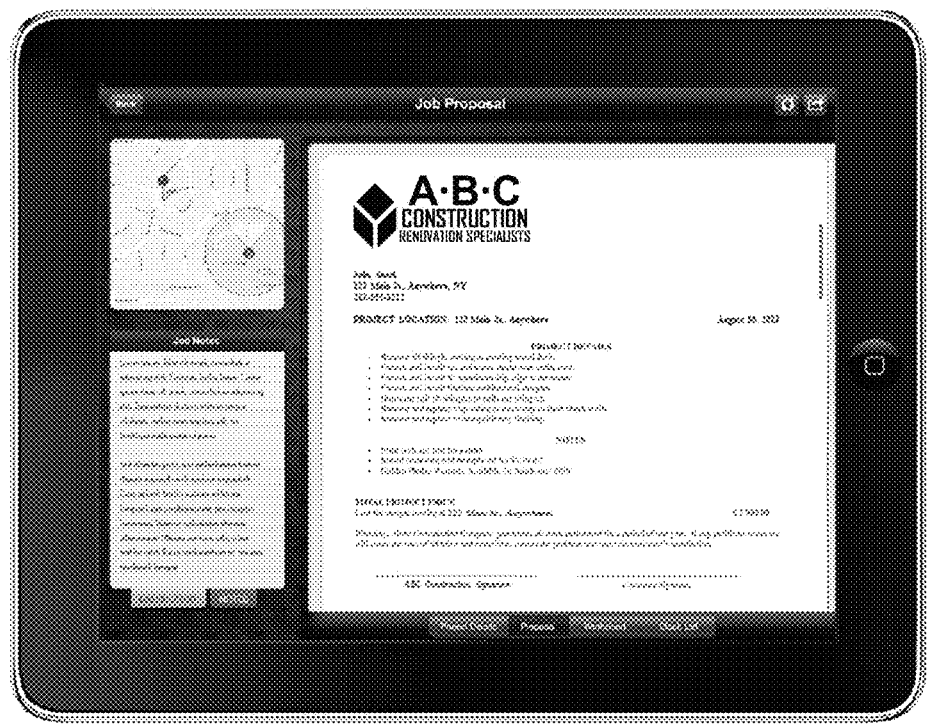
FIG. 10 depicts an exemplary screen of a display according to an embodiment of the present disclosure showing a generated estimate (a proposal)
Figure 11:
FIG. 11 depicts the screen of FIG. 10 showing additional detail of the generated estimate (a stock list)
Figure 12:
FIG. 12 depicts the screen of FIGS. 10-11 showing a job worksheet (bill of materials)
Figure 13:
FIG. 13 depicts a screen of the present disclosure showing a prompt wherein a user may select from saved projects.
Figure 14:
FIG. 14 depicts a configuration screen wherein the user may input company details for inclusion on generated estimates.
Figure 15:
FIG. 15 depicts a screen wherein multiple electronic images of a structure may be retrieved for a project.
Figure 16:
FIG. 16 depicts the screen of FIG. 15 wherein the calculator has been replaced by a notepad.
Figure 17:
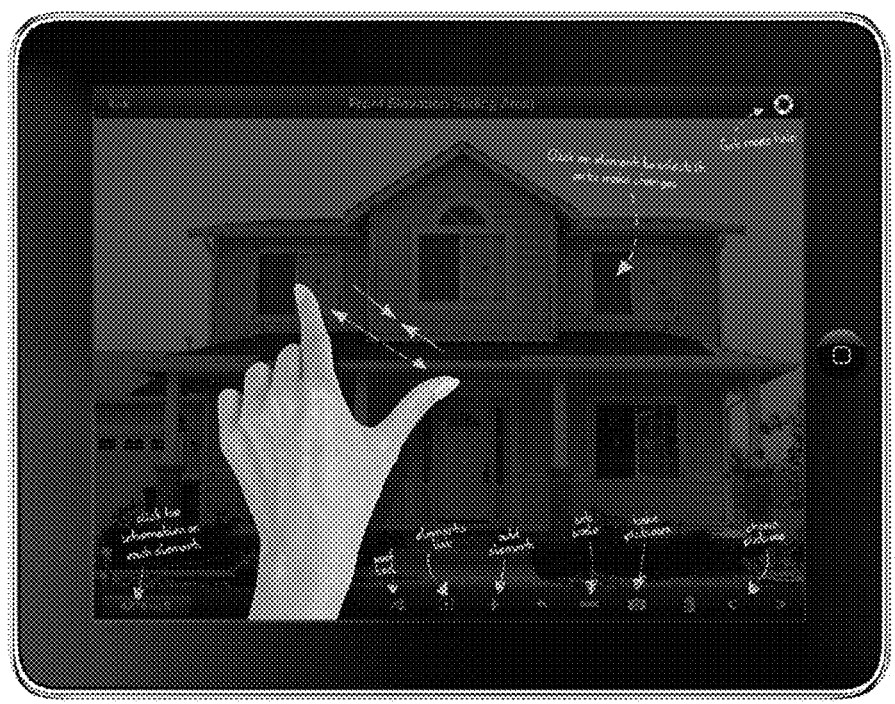
FIG. 17 depicts a screen of an application according to the present disclosure showing prompts for use of the user interface.
Figure 18:
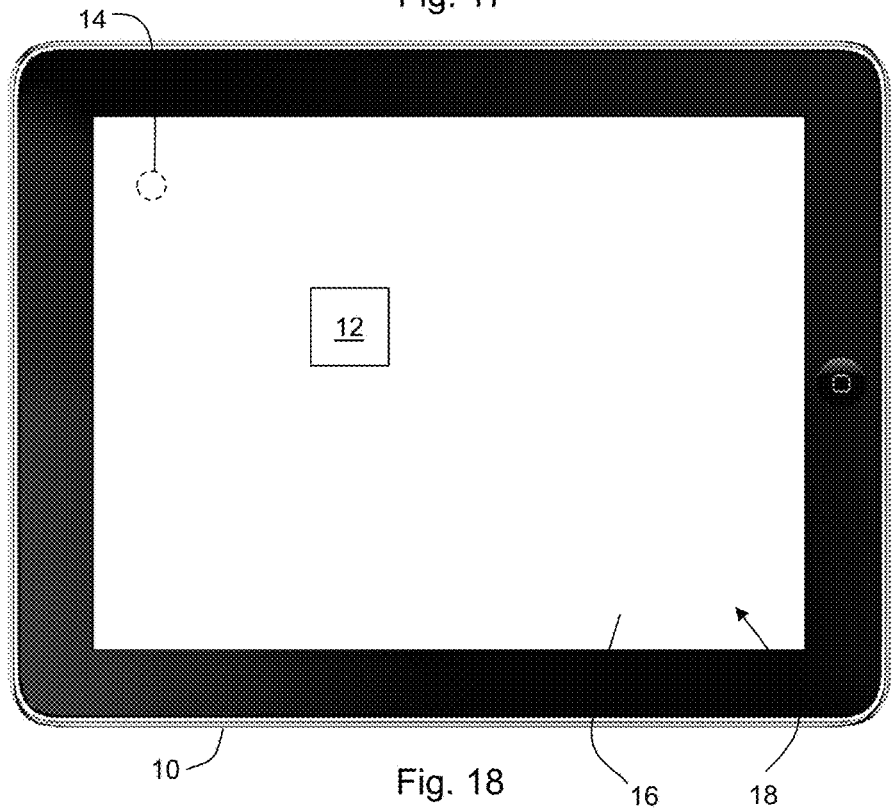
FIG. 18 is a diagram of a system according to an embodiment of the present disclosure.

The method 100 may further comprise receiving 200 a structure type and displaying 203 prompts for specific information needed for the selected structure type. For example, in determining the amount of roofing material needed, the area of a roof may be calculated and prompts may be displayed 203 for specific information needed for roof type—for example, prompts for "gable roof" or "hip roof" Prompts may be displayed 203 for manual input by the user, for example, the user may input manual measurements of the roof, manual entry for the roof pitch, etc. Where the values are determined automatically, the user may receive prompts for proper entry of measurement points needed. For example, in automatically determining roof pitch using an electronic image of a side elevation of a structure, the displayed 203 prompts may show the user how to align reference points to determine the angle of the roof from the horizon (see, e.g., FIGS. 5-6).

The present disclosure may be embodied as a system 10 for generating a construction estimate. The system 10 comprises a processor 12 and a camera 14 in electronic communication with the processor 12. The system 10 further comprises a display 16 and an input device 18, each of which are in electronic communication with the processor. In an embodiment, the display 16 is a touch screen display such that the display 16 and the input device 18 are integral. The system 10 may be integrated in a single housing, such as in the example of an Apple iPad. In other embodiments, the system 10 may have separate components—for example, the camera may be separate from the processor (in communication by way of a wired or wireless connection).

The processor 12 is programmed to perform any of the above-described methods. For example, the processor 12 may be programmed to receive, from the camera, an electronic image of a portion of the structure, wherein the electronic image includes an image of a placard having predetermined dimensions at a location proximate to the portion of the structure; display the electronic image on the display; determine the location of the placard within the electronic image; determine the dimensions of the image of the placard; calculate a scaling factor based on the dimensions of the image of the placard and the predetermined dimensions of the placard; receive, from the input device, at least two reference points in the electronic image and a measurement type; calculate a measurement of the received measurement type, using the at least two reference points and the calculated scaling factor; and generate an estimate for renovating the structure using the calculated measurement.

Although described as a processor, it is to be appreciated that the processor 12 may be implemented in practice by any combination of hardware, software and firmware. Also, its functions as described herein may be performed by one unit, or divided up among different components, each of which may be implemented in turn by any combination of hardware, software, and firmware. Program code or instructions for the processor 12 to implement the various methods described herein may be stored in non-transient computer readable storage media, such as memory.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A computer-based method of generating an estimate for renovating a structure, the method comprising:
    obtaining an electronic image of a portion of the structure, wherein the electronic image includes an image of a placard having predetermined dimensions at a location proximate to the portion of the structure;
    displaying the electronic image on a display;
    determining the location of the placard within the electronic image;
    determining the dimensions of the image of the placard;
    calculating a scaling factor based on the dimensions of the image of the placard and the predetermined dimensions of the placard;
    receiving, from a user, at least two reference points in the electronic image and a measurement type;
    calculating a measurement of the received measurement type, using the at least two reference points and the calculated scaling factor; and
    generating an estimate for renovating the structure using the calculated measurement; and
    de-skewing the electronic image for more accurately calculating the measurement, wherein de-skewing comprises:
        displaying a grid superimposed over the displayed electronic image;
        receiving skew points from the user, wherein the skew points result from the user altering the displayed grid to correspond with a shape of the portion of the structure in the image;
        calculating a de-skew transform based on the received skew points; and
        adjusting the calculated measurement by the de-skew transform.

2. The computer-based method of claim 1, wherein the electronic image is obtained using a camera.

3. The computer-based method of claim 1, wherein the electronic image is obtained from a storage location.

4. The computer-based method of claim 1, wherein the measurement type is an area and the at least two reference points indicate the boundaries of the area to be calculated.

5. The computer-based method of claim 1, wherein the measurement type is a distance between the at least two measurement points.

6. The computer-based method of claim 1, wherein the measurement type is a count of the number of measurement points.

7. The computer-based method of claim 1, wherein the measurement type is a volume and the at least two reference points indicate the boundaries of the volume to be calculated.

8. The computer-based method of claim 1, wherein the step of generating an estimate for renovating the structure further comprises the sub-steps of:
  receiving a material type corresponding to the calculated measurement; and
  generating the estimate for renovating the structure using the calculated measurement and the received material type.

9. The computer-based method of claim 1, wherein the placard includes a predetermined pattern such that the placard location may be automatically determined using the processor.

10. The computer-based method of claim 1, wherein the placard location is determined by receiving at least one placard location indicator from the user.

11. An apparatus for generating an estimate for renovating the structure, the apparatus comprising:
  a processor;
  a camera in electronic communication with the processor;
  a display in electronic communication with the processor;
  an input device in communication with the processor; and
  wherein the processor is programmed to:
    receive, from the camera, an electronic image of a portion of the structure, wherein the electronic image includes an image of a placard having predetermined dimensions at a location proximate to the portion of the structure;
    display the electronic image on the display;
    determine the location of the placard within the electronic image;
    determine the dimensions of the image of the placard;
    calculate a scaling factor based on the dimensions of the image of the placard and the predetermined dimensions of the placard;
    receive, from the input device, at least two reference points in the electronic image and a measurement type;
    calculate a measurement of the received measurement type, using the at least two reference points and the calculated scaling factor;
    generate an estimate for renovating the structure using the calculated measurement and
    de-skew the electronic image for more accurately calculating the measurement, wherein de-skewing comprises:
      displaying a grid superimposed over the displayed electronic image;
      receiving skew points from the user, wherein the skew points result from the user altering the displayed grid to correspond with a shape of the portion of the structure in the image;
      calculating a de-skew transform based on the received skew points; and
      adjusting the calculated measurement by the de-skew transform.

12. The apparatus of claim 1, wherein the input device is a touch panel overlaid on the display.

13. The apparatus of claim 1, further comprising a housing configured to contain the processor, camera, display, and input device.

* * * * *